UNITED STATES PATENT OFFICE.

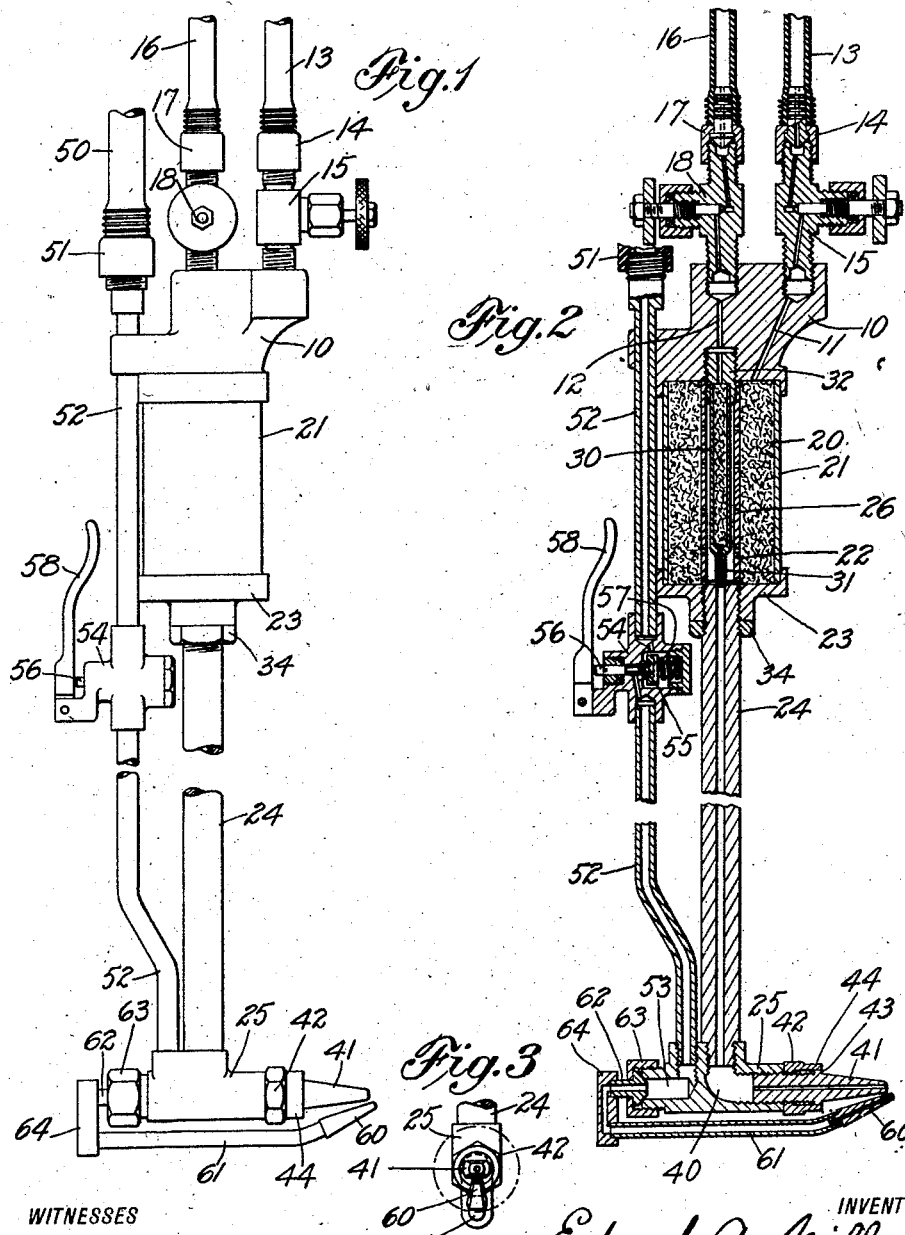

EDWARD A. MILLER, OF NEW YORK, N. Y., ASSIGNOR TO ACETYLENE WELDING COMPANY, OF NEW YORK, N. Y., A CORPORATION OF NEW YORK.

CUTTING-TORCH.

1,055,065.

Specification of Letters Patent.

Patented Mar. 4, 1913.

Application filed October 24, 1910. Serial No. 588,603.

*To all whom it may concern:*

Be it known that I, EDWARD A. MILLER, a citizen of the United States of America, residing at New York city, in the county of New York and State of New York, have invented certain new and useful Improvements in Cutting-Torches, of which the following is a specification, reference being had therein to the accompanying drawing.

This invention relates to torches or tools intended for cutting steel and iron by the method which consists in directing a fine jet of oxygen under suitable pressure against the metal which has first been heated to incandescence or incipient fusion. This method of cutting metal requires for its efficient practice a tool or torch device which is adapted to supply a jet of combined gas for producing a suitable heating flame, and, in proper close relation to said jet, a jet of oxygen under suitable pressure, and which is provided with means for properly locating and controlling the heating and cutting jets.

The object of the present invention is to provide a cutting torch or tool of this character which shall be efficient in action and convenient in use, and which shall provide not only for convenient and accurate control of both the heating and cutting jets, but shall be so constructed as to permit of relative adjustment of the heating or flame tip and the cutting tip to permit of the most convenient use of the tool for cutting in various directions and in different positions and to make up for burning off of the cutting tip.

A full understanding of the invention can best be given by a detailed description of a construction embodying the various features of the invention in the preferred form, and such a description will now be given in connection with the accompanying drawings showing such a preferred construction.

In said drawings: Figure 1 is a side view of the torch with parts of the main connecting tubes broken out. Fig. 2 is a central longitudinal sectional view of the torch. Fig. 3 is an end view of the torch head looking toward the tip end of the head.

Referring to the drawings, 10 represents a body piece provided with an inlet passage 11 for fuel gas and an inlet passage 12 for oxygen. The fuel gas is supplied under pressure from a suitable source through a flexible tube 13, which connects by means of a coupling or union 14 with a controlling valve 15, which is screwed into the body piece 10 to connect with the inlet passage 11. The oxygen is supplied under pressure from a suitable source of supply through a flexible tube 16 which is connected by a coupling 17 with the inlet side of a controlling valve 18 which is secured to the body piece 10 to connect with the inlet passage 12. The gas inlet passage 11 leads to a chamber 20 which is packed between an outer cylindrical casing 21 and an inner cylinder or tube 22 with a suitable incombustible porous material such as asbestos packing of suitable quality. The body piece 10 forms one head of the chamber 20, and the other end is formed by a cap piece 23 secured to the casing 21 and from which a tube leads to the torch head. The inner cylinder 22 extends to or substantially to the forward end of the chamber 20, and is provided with perforations 26 which form inlet passages for the passage of the fuel gas from the packed space of the chamber to the interior of the cylinder 22. The packed chamber 20 prevents the flame from getting back of the chamber in case of a flash-back.

The oxygen inlet passage 12 connects with a tube 30 which is mounted within the perforated cylinder 22 and which is also packed with asbestos or other suitable incombustible porous material to insure against flame passing back of this point. The tube 30 terminates at its forward end in a fine discharge passage 31 through a tapered tip which extends slightly into the tube 24 so that the fine jet of oxygen discharged at high velocity from the passage 31 into the tube 24 will operate as in an injector to aid in drawing the fuel gas into the tube 24 and thus insure the mixing of the gases in proper proportion according to the adjustment of the valves 15 and 18. The end of the tube 24 is preferably reamed out slightly as shown. The tube 30 in the construction shown is set into and carried by a connecting nipple 32 which screws into a threaded opening in the body piece 10, and which also screws into the threaded end of the perforated tube or cylinder 22 so as to hold said perforated tube in position. By adjusting the nipple 32 when the parts are being assembled, the tube 30 may be readily set with its discharge end extending into the end of the tube 24 to a greater or lesser degree as desired. The tube 24, as shown, is connected to the cap 23 by being screwed into a threaded central opening in the cap until its inner end comes flush with the inner face of the cap, and is locked by means of a nut 34. Relative adjustment between the tubes 30 and 24 might obviously be obtained also by adjusting the tube 24 in the cap 23.

The bore or passage of the connecting tube 24 forms the mixing chamber which receives the oxygen and fuel gas from the pipe 31 and chamber 20 respectively and delivers the mixture to the torch head 25. The torch head extends transverse to the pipe 24 and is formed with a bore or passage 40 extending from one end and open at one side to receive the end of the tube 24. The passage 40 is threaded to receive the threaded end of a burner or flame tip 41 which may be of any suitable material, such as brass, and of the usual tapered form with a through passage of suitable size. After being screwed into the head, the tip 41 is locked in place by means of a lock nut 42 so that by simply loosening the nut and turning the tip in one direction or the other it may be moved inward or outward to bring it into any desired position of longitudinal adjustment relatively to the cutting tip, as hereinafter explained. In order to prevent fragments of metal or cinders or any foreign substance from clogging the thread of the tip and interfering with or preventing adjustment thereof, the tip is formed beyond its threaded portion with a collar 43 and the nut 42 is formed with an outwardly extending sleeve or apron 44 which fits closely about the collar 43, the collar and sleeve being located and proportioned so that the sleeve will extend over the collar in all intended positions of adjustment of the tip.

The oxygen for the cutting blast is supplied from a suitable source under appropriate pressure through a flexible tube 50 which is connected by a coupling 51 with a tube 52 secured near its receiving end to the body piece 10 and extending forward past the cylinder 21 and adjacent to the pipe 24 to connect at its forward end with the torch head 25 adjacent to the point of connection of the pipe 24 with the torch head. The tube 52 discharges into a bore or passage 53 in the torch head which has a side opening to receive the end of the tube 52 and which also opens to the end of the torch head opposite to the end which carries the flame tip. The tube 52 is provided with a valve 54 which may be of any suitable form but is best of the quick-acting disk form shown, arranged to open against the pressure of the oxygen and normally closed. As shown, the valve disk 55, carried by a spindle 56, is pressed against its annular seat by a spring 57 as well as by the pressure of the gas in the inlet chamber of the valve. A hand lever 58 serves to depress the spindle and open the valve when desired. The cutting tip 60 through which the blast of oxygen is discharged from the passage 53 in the torch head is mounted close to the flame tip 41 and is adjustable concentrically about the tip 41, being for this purpose carried by a tube 61 which is connected with the passage 53 and secured to the torch head by a coupling nipple 62, formed preferably with a tapered face to engage the end of the torch head and secured thereto by a shouldered threaded sleeve or coupling nut 63. When the nut 63 is screwed down to force the nipple 62 against the end of the torch head, the tube 61 and tip 60 will be held rigidly in position, but by slightly unscrewing the sleeve 63, the nipple will be loosened so as to permit the tube and tip to be turned or swung concentrically about the head and tip 41 to the desired position. The range of adjustment includes almost a complete circle and enables the cutting tip to be set in such positions relatively to the flame tip as may be required or convenient for using the torch under practically all possible conditions.

The coupling nipple 62 by which the tube 61 is secured to the torch head may be formed on or secured to the tube 61 in any suitable manner. As shown, the coupling nipple and the tube are formed of separate parts which are both rigidly connected to a connecting piece 64 which is provided with a connecting passage.

In using the torch, the supply tubes 13, 16 and 50 being connected with the proper sources of supply, and the cutting tip having been turned to and secured in the desired position with relation to the flame tip, according to the position and direction of the cut to be made, and the flame tip being in its proper position of longitudinal adjustment, the controlling valves 15 and 18 will be opened and the combined fuel gas and oxygen lighted at the flame tip, and the size and character of the flame then adjusted by means of the two controlling valves. The torch will then be held to direct the heating flame against the metal to be cut at the point where the cut is to be started. When the metal at the starting point has become heated to the point of incipient fusion, the handle 58 is operated to open the oxygen valve 54 for supplying the jet of pure oxygen from the cutting nozzle 60. The oxygen of the jet, acting on the metal in the presence of great heat, converts the iron in the path of the jet into magnetic oxid which at the temperature of the reaction is in a molten condition and is driven away in a shower of drops and sparks by the mechanical force of the jet. The torch is then moved to advance the heating flame and the cutting jet in the direction of the desired cut to be made in the metal, the flame heating the metal as it advances, and the cutting jet of pure oxygen following and cutting through the metal.

For the best results, the flame tip should be adjusted longitudinally so that the end of the cutting tip will project slightly beyond the end of the flame tip, as shown in the drawings. As the cutting tip is burned away and becomes shorter, the flame tip may be moved inward to bring its point in proper relation to the cutting tip by simply loosening the nut 42 and screwing the flame tip inward the necessary amount and then again tightening the nut. Both the flame tip and the cutting tip are removable, as will be seen from the drawings, so as to permit of renewal when the tips become worn or deteriorated, or to permit of use of tips of different sizes for different classes of work.

The size of the through passages of the tips will vary according to the character of the work to be performed and the pressure of the gases. The passage in the flame tip will be of such proper size relatively to the size of the discharge passage of the tube 30 that the velocity with which the combined fuel gas and oxygen leaves the flame tip will not be sufficient to result in too great a tendency of the flame to blow off. Any suitable fuel gas may be used. Acetylene gas is usually best. The parts of the torch with which the fuel gas, whatever it is, comes in contact will of course be made of a metal or other suitable material which will not be acted on chemically by the gas.

It will be understood that the invention is not to be limited to the exact construction and arrangement of parts as in the construction shown in the drawings and to which the foregoing description has been mainly confined, but that it includes changes and modifications thereof within the claims.

What is claimed is:—

1. In a metal cutting torch, the combination of an inlet passage for fuel gas, a controlling valve therefor, an inlet passage for oxygen, a controlling valve therefor, a mixing chamber, a chamber packed with porous incombustible material between the mixing chamber and the inlet passage for fuel gas, a chamber packed with porous incombustible material between the mixing chamber and the inlet passage for oxygen, a flame tip communicating with the mixing chamber, a third inlet passage for oxygen under high pressure, a normally closed valve controlling the high pressure oxygen, a cutting tip communicating with the high pressure oxygen passage mounted close to the flame tip, and means for changing the relative positions of the flame tip and cutting tip by a movement of one of said tips about the other.

2. In a metal cutting torch, the combination of an inlet passage for fuel gas, a controlling valve therefor, an inlet passage for oxygen, a controlling valve therefor, a mixing chamber, a chamber packed with porous incombustible material between the mixing chamber and the inlet passage for fuel gas, a chamber packed with porous incombustible material between the mixing chamber and the inlet passage for oxygen, a flame tip communicating with the mixing chamber, a third inlet passage for oxygen under high pressure, a normally closed valve controlling the high pressure oxygen, a cutting tip communicating with the high pressure oxygen passage mounted close to the flame tip, means for adjusting the relative positions of the flame tip and cutting tip with respect to their angular relation to the body of the torch so that the cutting tip will follow the flame tip when the tips are moved in any direction within the range of adjustment provided by the adjusting means.

3. In a metal cutting torch, the combination with the body portion of the torch having a supply pipe for mixed fuel gas and oxygen and a supply pipe for oxygen under high pressure, of a torch head having a passage communicating with the pipe for supplying the mixture of fuel gas and oxygen and a passage communicating with the high pressure oxygen supply pipe, a flame tip communicating with the first said passage, and a cutting tip communicating with the second said passage and mounted adjacent to the flame tip.

4. In a metal cutting torch, the combination with the body portion of the torch having a supply pipe for mixed fuel gas and oxygen and a supply pipe for oxygen under high pressure, of a torch head having a passage communicating with the pipe for supplying the mixture of fuel gas and oxygen and a passage communicating with the high pressure oxygen supply pipe, a flame tip communicating with the first said passage, and a cutting tip communicating with the second said passage and mounted adjacent to the flame tip and connected with the torch by means formed to permit it to be adjusted circumferentially about the flame tip.

In testimony whereof I affix my signature in presence of two witnesses.

EDWARD A. MILLER.

Witnesses:
JEANNETTE STORK,
A. L. KENT.